US008166022B2

(12) United States Patent
Han et al.

(10) Patent No.: US 8,166,022 B2
(45) Date of Patent: Apr. 24, 2012

(54) SYSTEM, METHOD, AND APPARATUS FOR PARALLELIZING QUERY OPTIMIZATION

(75) Inventors: Wook-Shin Han, Daegu (KR); Wooseong Kwak, Daegu (KR); Jinsoo Lee, Kyungsangpook-do (KR); Guy M Lohman, San Jose, CA (US); Volker Markl, Raubling (DE)

(73) Assignees: International Business Machines Corporation, Armonk, NY (US); Kyungpook National University, Daegu (KR)

( * ) Notice: Subject to any disclaimer, the term of this patent is extended or adjusted under 35 U.S.C. 154(b) by 331 days.

(21) Appl. No.: 12/542,937

(22) Filed: Aug. 18, 2009

(65) Prior Publication Data

US 2011/0047144 A1    Feb. 24, 2011

(51) Int. Cl.
*G06F 17/30* (2006.01)

(52) U.S. Cl. ...................................................... 707/718
(58) Field of Classification Search ............ 707/713–720
See application file for complete search history.

(56) References Cited

U.S. PATENT DOCUMENTS

| | | | |
|---|---|---|---|
| 5,301,317 A * | 4/1994 | Lohman et al. | 707/999.002 |
| 5,590,319 A | 12/1996 | Cohen et al. | |
| 5,692,174 A | 11/1997 | Bireley et al. | |
| 6,009,265 A | 12/1999 | Huang et al. | |
| 6,112,198 A | 8/2000 | Lohman et al. | |
| 6,493,701 B2 * | 12/2002 | Ponnekanti | 707/999.002 |
| 6,625,593 B1 | 9/2003 | Leung et al. | |
| 7,472,107 B2 * | 12/2008 | Agrawal et al. | 707/999.002 |
| 7,587,383 B2 * | 9/2009 | Koo et al. | 707/999.002 |
| 7,685,437 B2 * | 3/2010 | Hacigumus et al. | 713/193 |
| 2006/0080285 A1 | 4/2006 | Chowdhuri | |
| 2006/0218123 A1 | 9/2006 | Chowdhuri et al. | |

OTHER PUBLICATIONS

Ganguly et al. "Query Optimization for Parallel Execution". Proceedings of the 1992 ACM SIGMOD International Conference on Management of Data, (1992), pp. 9-18.
Hong et al. "Optimization of Parallel Query Execution Plans in XPRS". Distributed and Parallel Databases, vol. 1, Issue 1, (Jan. 1993), pp. 9-32.
Han et al. "Parallelizing Query Optimization". Proceedings of the VLDB Endowment, vol. 1, Issue 1, (Aug. 2008), pp. 188-200.

* cited by examiner

*Primary Examiner* — James Trujillo
*Assistant Examiner* — Jorge A Casanova
(74) *Attorney, Agent, or Firm* — Jeffrey T. Holman

(57) ABSTRACT

A computer program product that includes a computer useable storage medium to store a computer readable program that, when executed on a computer, causes the computer to perform operations, including operations to receive a query for which a query execution plan (QEP) is to be computed, divide a search space into a plurality of subproblems for which constituent QEPs are to be created, partition the plurality of subproblems into a plurality of partitions, and allocate each of the plurality of partitions to a thread of a plurality of threads within a multiple thread architecture. Possible QEPs describe a search space. Each subproblem references one or more quantifiers and each of the subproblems within a partition references the same number of quantifiers. A partition containing subproblems referencing fewer quantifiers is executed before a partition containing subproblems referencing more quantifiers.

18 Claims, 7 Drawing Sheets

SYSTEM, METHOD, AND APPARATUS FOR PARALLELIZING QUERY OPTIMIZATION

BACKGROUND

Many commercial relational database management systems (RDBMSs) employ cost-based query optimization exploiting dynamic programming (DP) to efficiently generate the optimal query execution plan. However, optimization time increases rapidly for queries joining more than 10 tables. Randomized or heuristic search algorithms reduce query optimization time for large join queries by considering fewer plans, sacrificing plan optimality. Though commercial systems executing query plans in parallel have existed for over a decade, the optimization of such plans still occurs serially.

The success of RDBMSs can largely be attributed to the standardization of the structured query language (SQL) query language and the development of sophisticated query optimizers that automatically determine the optimal way to execute a declarative SQL query by enumerating many alternative query execution plans (QEPs), estimating the cost of each, and choosing the least expensive plan to execute. Many commercial RDBMSs employ DP. DP builds QEPs "bottom up" and exploits the principle of optimality to prune sub-optimal plans at each iteration (thereby saving space) and to guarantee that the optimal QEP is found without evaluating redundant sub-plans.

As the number of tables referenced in a query increases, however, the number of alternative QEPs considered by a DP-based optimizer can, in the worst case, grow exponentially. This means that many real-world workloads that reference more than 20 tables would have prohibitive optimization times using current DP optimization. In extreme cases (queries referencing a large number of relatively small tables), the time to optimize a query with DP may even exceed the time to execute it. Although randomized or heuristic (e.g., greedy) search algorithms reduce the join enumeration time by not fully exploring the entire search space, this can result in sub-optimal plans that execute orders of magnitude slower than the best plan, more than negating any savings in optimization time by such heuristics. And while the plan picked by the optimizer can sometimes be stored and reused, thereby amortizing the optimization cost over multiple executions, changes to the parameters in the query or the underlying database's characteristics may make this approach sub-optimal, as well.

SUMMARY

Embodiments of a computer program product are described. In one embodiment, the computer program product includes a computer useable storage medium to store a computer readable program that, when executed on a computer, causes the computer to perform operations, including operations to receive a query for which a QEP is to be computed, divide a search space into a plurality of subproblems for which constituent QEPs are to be created, partition the plurality of subproblems into a plurality of partitions, and allocate each of the plurality of partitions to a thread of a plurality of threads within a multiple thread architecture. A set including all possible QEPs for the query describes a search space. Each QEP of the set references a plurality of quantifiers. The constituent QEPs reference a smaller number of quantifiers. Each of the subproblems within a partition references the same number of quantifiers. A partition containing subproblems referencing fewer quantifiers is executed before a partition containing subproblems referencing more quantifiers. Other embodiments of the computer program product are also described.

Embodiments of a computer-implemented method are also described. In one embodiment, the computer-implemented method is a method for determining an optimal QEP for a query. The method includes receiving a query for which a query execution plan (QEP) is to be computed by a QEP optimizer server, dividing a search space into a plurality of subproblems for which constituent QEPs are to be created at the QEP optimizer server, and generating a skip vector array (SVA) that indicates disjoint quantifier sets between two subproblems at the QEP optimizer server. The method also includes partitioning the plurality of subproblems into a plurality of partitions at the QEP optimizer server, allocating each of the plurality of partitions to a thread of a plurality of threads within a multiple thread architecture at the QEP optimizer server, receiving from each of the plurality of threads a constituent QEP for each subproblem at the QEP optimizer server, and combining two constituent QEPs at the QEP optimizer server to determine the QEP. A set including all possible QEPs describes the search space. Each QEP of the set references a plurality of quantifiers. The constituent QEPs reference a smaller number of quantifiers. Each of the subproblems within a partition references the same number of quantifiers, and subproblems that are indicated as not disjoint by the SVA are excluded from the plurality of partitions. A partition containing subproblems referencing fewer quantifiers is executed before a partition containing subproblems referencing more quantifiers. Other embodiments of the computer-implemented method are also described.

Embodiments of a system are also described. In one embodiment, the system is a system for determining an optimal QEP for a query. In one embodiment, the system includes a database, a query receiver, and a QEP parallel optimizer. The query receiver receives a query for which a QEP is to be computed, and a set including all possible QEPs describes a search space. Each QEP of the set references a plurality of quantifiers. The QEP parallel optimizer includes a subproblem generator, a partitioner, and a process allocator. The subproblem generator divides the search space into a plurality of subproblems for which constituent QEPs are to be created. The constituent QEPs reference a smaller number of quantifiers. The partitioner partitions the plurality of subproblems into a plurality of partitions. Each of the subproblems within a partition references the same number of quantifiers. The process allocator allocates each of the plurality of partitions to a thread of a plurality of threads within a multiple thread architecture. A partition containing subproblems referencing fewer quantifiers is executed before a partition containing subproblems referencing more quantifiers. Other embodiments of the system are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

In order to improve the speed of generation of QEPs, QEP generation is parallelized to exploit multi-core processor architectures whose main memory is shared among all cores. Parts of the optimizer's search space are allocated relatively evenly among threads, resulting in a near-linear speed-up in the number of cores that can be utilized. A parallel, DP-based join enumerator generates optimal QEPs for much larger queries than can practically be optimized by traditional query optimizers (>12 tables). While parallelism doesn't negate the inherent exponential nature of DP, it can significantly increase the practical use of DP from queries having relatively few tables to those having more than relatively many tables, depending upon how strongly connected the query graph is.

Parallelizing query optimization is not as simple as it might first appear. The DP algorithm used in join enumeration belongs to the non-serial polyadic DP class, which is known to be very difficult for parallelization due to its non-uniform data dependence. Sub-problems in other applications of DP depend on only a fixed number of preceding levels (mostly, two), whereas sub-problems in join enumeration depend on all preceding levels. Thus, existing parallel DP algorithms cannot be directly applied. Therefore, the optimizer uses a parallel QEP generator which views join enumeration as a series of self-joins on the MEMO table containing plans for subsets of the tables (or quantifiers).

Parallel query optimization can speed up many other applications that exploit the query optimizer. It can help feedback-based query optimization such as progressive optimization (POP), especially for queries that have longer compilation time than execution time. Since POP repeatedly invokes an optimizer until it finds an optimal plan, parallel optimization can speed up such queries. Automatic physical database tools that exploit the query optimizer as a "What if?" tool, such as index advisors, are dominated by the time to re-optimize queries under different "What if?" scenarios, and so will also enjoy significantly improved execution times from parallelized query optimization.

Figure 1:
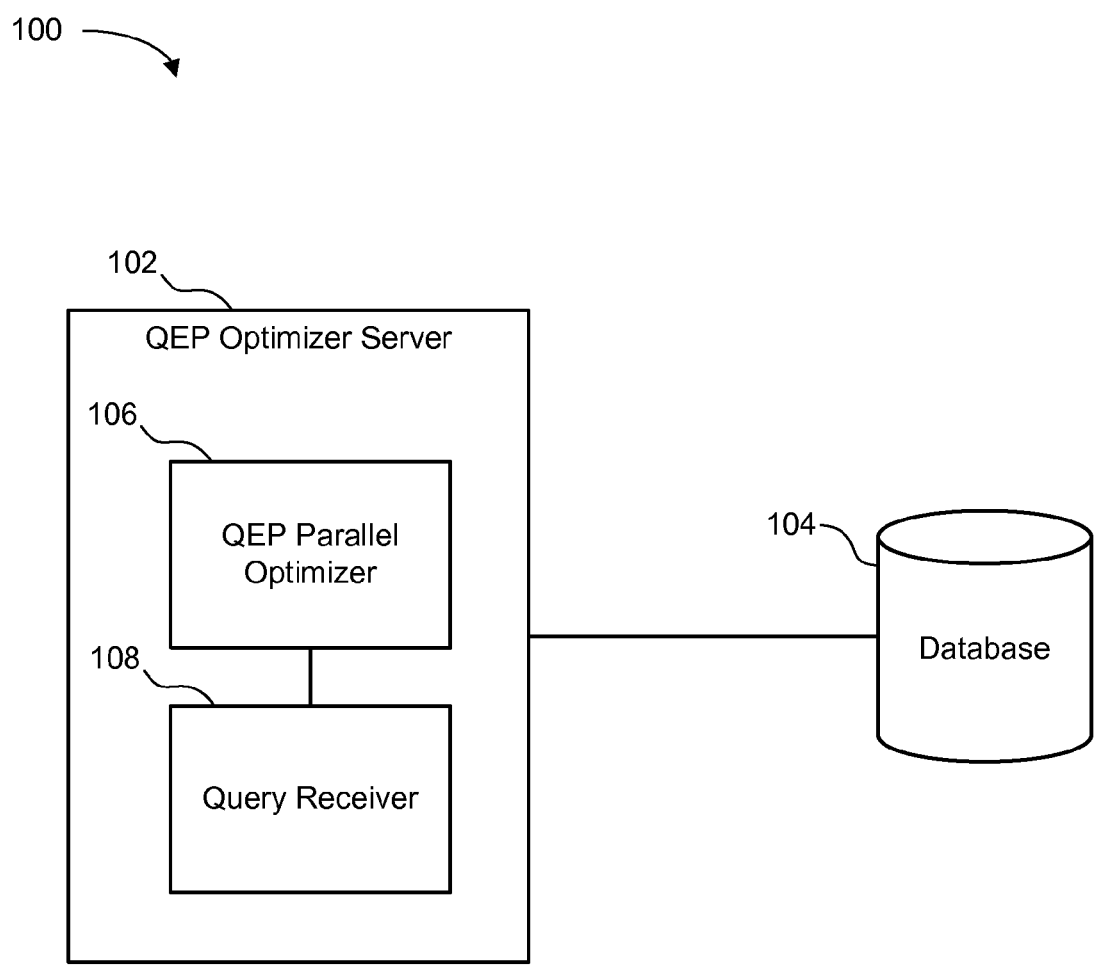
FIG. 1 depicts a schematic diagram of one embodiment of a system for generating an optimal QEP from a query.

FIG. 1 depicts a schematic diagram of one embodiment of a system 100 for generating an optimal QEP from a query. The system 100 includes a QEP optimizer server 102, a database 104, a QEP parallel optimizer 106, and a query receiver 108. The system 100 receives a query and utilizes a multi-threaded architecture to generate the optimal QEP.

The QEP optimizer server 102, in one embodiment, includes the QEP parallel optimizer 106 and the query receiver 108. In an alternative embodiment, one or both of the QEP parallel optimizer 106 and/or the query receiver 108 are separate from the QEP optimizer server 102. For example, the query receiver 108 may be an interface operating on a separate computer from the QEP optimizer server 102.

In one embodiment, the database 104 contains data including one or more tables that may be accessed by a query. For example, the database 104 may operate on a database server (not shown) that stores data in an in-memory database. In another example, the database 104 may operate on a database server that that stores data on one or more hard drives. The tables in the database 104 may include a plurality of tuples, and data in one part of the database 104 may be related to data in another part of the database.

The QEP parallel optimizer 106, in one embodiment, directs the execution of multiple threads in a multithreaded environment to generate the optimal QEP for a given query. The QEP parallel optimizer 106 operates as one or more processes operating on the QEP optimizer server 102 having access to the database 104. The QEP parallel optimizer 106 is discussed in greater detail in relation to FIG. 2. In some embodiments, the QEP parallel optimizer 106 executes in response to determining that the number of quantifiers in the query exceeds a threshold value. For example, the QEP parallel optimizer 106 may execute when the number of quantifiers is greater than a threshold value of twelve, and a traditional, non-parallel QEP optimizer may determine QEPs when the number of quantifiers is less than or equal to the threshold value of twelve.

In one embodiment, the query receiver 108 receives a query for which a QEP is to be generated. The query receiver 108 may be any type of hardware or software capable of receiving the query. For example, the query receiver 108 may be a process running on the QEP optimizer server 102 capable of receiving a query via a network connection (not shown).

The query received by the query receiver 108, in some embodiments, describes one or more relationships between data entries in the database 104. For example, the query may be an SQL query and include one or more relationship descriptions.

Figure 2:
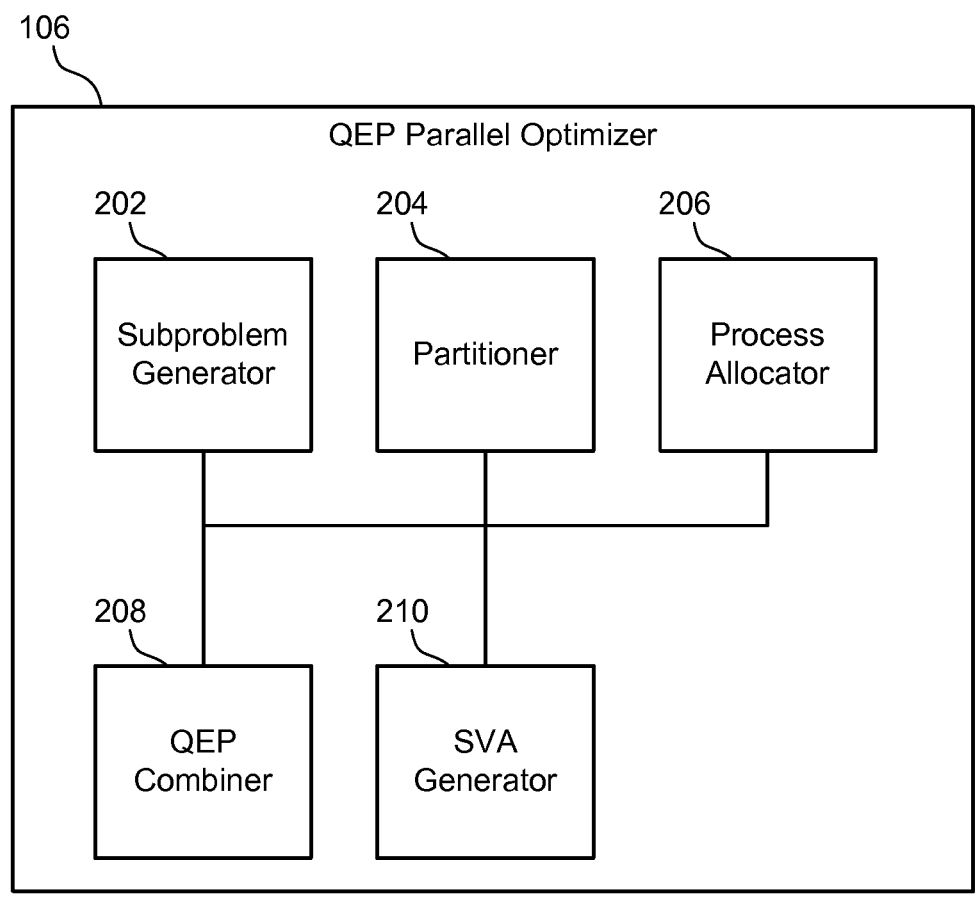
FIG. 2 depicts a schematic diagram of one embodiment of the QEP parallel optimizer of FIG. 1.

FIG. 2 depicts a schematic diagram of one embodiment of the QEP parallel optimizer 106 of FIG. 1. The QEP parallel optimizer 106 includes a subproblem generator 202, a partitioner 204, a process allocator 206, a QEP combiner 208, and a skip vector array (SVA) generator 210. The QEP parallel optimizer 106, in one embodiment, directs the execution of multiple threads in a multithreaded environment to generate the optimal QEP for a given query.

The subproblem generator 202, in one embodiment, divides the query into one or more subproblems. Subproblems may then be analyzed to determine an optimal constituent QEP for executing the subproblem by determining relative costs for alternative constituent QEPs. In some embodiments, the subproblem generator 202 operates recursively, and generates additional subproblems from other subproblems. In this manner, large, complicated queries are broken down into multiple, relatively simple subproblems for which a computational cost can be calculated. Some methods implementing strategies for generating subproblems are described below in relation to FIGS. 3-9.

In one embodiment, the partitioner 204 partitions subproblems generated by the subproblem generator 202 into partitions. The partitioner 204 assigns subproblems to a partition such that computational cost for the subproblems in the partition can be modeled without relying on subproblems in a partition that has not been executed. In some embodiments, the partitioner 204 partitions subproblems into partitions such that all of the subproblems in the partition have a total number of quantifiers referenced that is equal to a predetermined size. For example, the predetermined size may be four, and the partitioner 204 may assign subproblems that all reference four quantifiers to a partition. Some methods for partitioning strategies are described below in relation to FIGS. 3-9.

The process allocator 206, in one embodiment, allocates a partition generated by the partitioner 204 to a process to model the costs associated with executing the subproblems in the partition and determine optimal subproblems, which are the subproblems having the lowest cost. Individual processes may run on separate threads in a multithreaded architecture, and may operate on separate cores or discrete central processing units (CPUs). The process allocator 206 manages a processing order of the partitions such that partitions containing subproblems that rely on cost estimates for smaller subproblems are allocated after partitions containing the smaller subproblems. Some process allocation strategies are described below in relation to FIGS. 3-9.

The QEP combiner 208 combines smaller optimal subproblems to form larger optimal subproblems, in one embodiment. The QEP combiner 208 may operate recursively to build increasingly larger optimal solutions, ultimately building a solution that represents the optimal QEP for the received query.

In one embodiment, the SVA generator 210 generates an SVA. The SVA is formed from a list of skip vectors. Each skip vector is an array of skip indexes. Each skip index indicates the next quantifier set to be compared in a plan partition. Use of an SVA generated by the SVA generator 210 reduces the number of comparisons that are made between disjoint quantifier sets, and therefore reduces the amount of computation required to determine the optimal QEP. SVAs are described in greater detail in relation to FIGS. 8-9.

Figure 3:
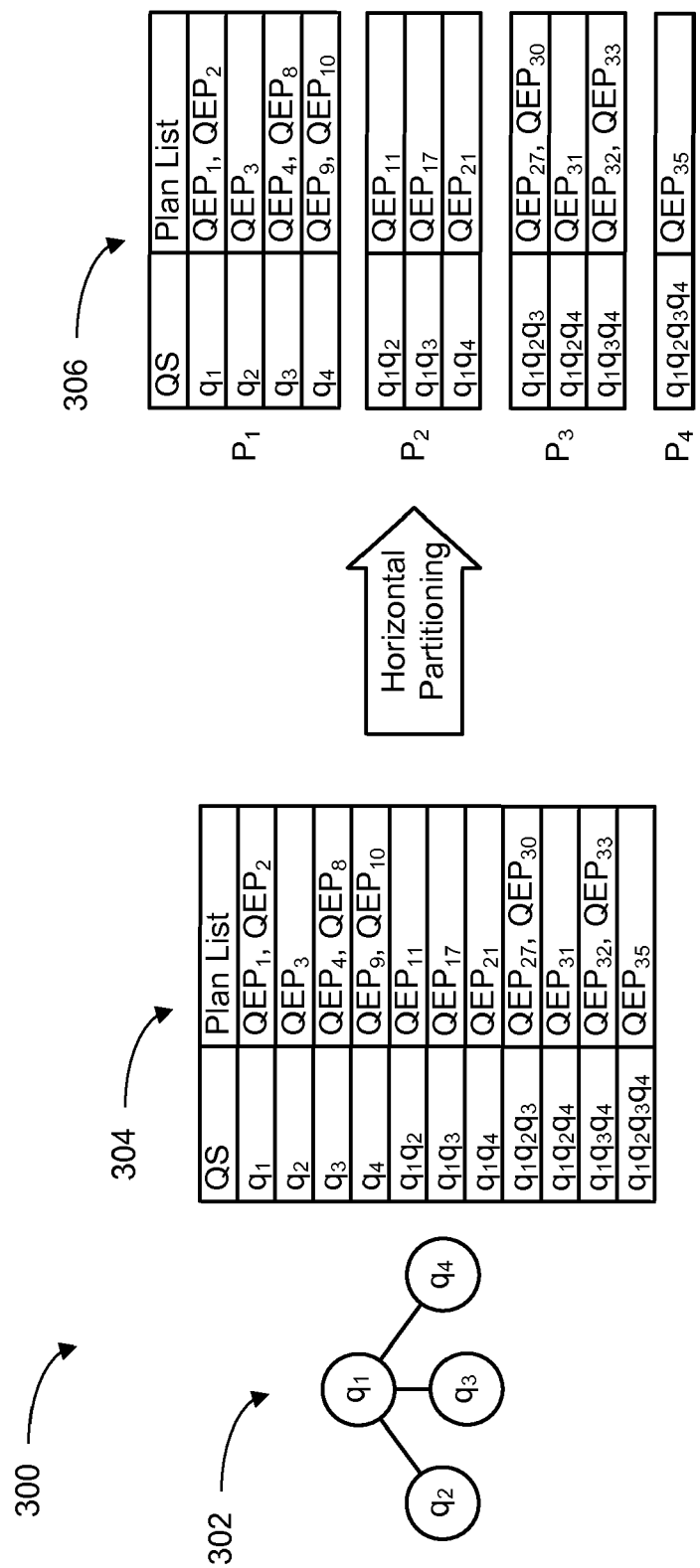
FIG. 3 depicts a schematic diagram of one embodiment of a method for partitioning a search space of possible QEPs.

FIG. 3 depicts a schematic diagram of one embodiment of a method 300 for partitioning a search space of possible QEPs. The method 300 includes a query graph 302, a plan relation table 304, and a set of plan partitions 306. The method 300 divides the search space into partitions 106 based on a number of quantifiers.

A review of traditional, serial DP optimization in serial optimization to enumerate join orders is helpful in understanding parallelization of query optimization. Method 1, shown below, describes a method for implementing traditional serial DP optimization, and is referred to herein as SerialDPEnum. SerialDPEnum generates query execution plans (QEPs) in a "bottom up" fashion. It first generates different QEPs for accessing a single table. Types of table access QEPs include a simple sequential scan, index scan, list prefetch, index ORing, and index ANDing. SerialDPEnum then calls PrunePlans to prune any plan $QEP_1$ if there is another plan $QEP_2$ such that $cost(QEP_1) > cost(QEP_2)$, and whose properties (e.g., tables accessed, predicates applied, ordering of rows, partitioning, etc.) subsume those of $QEP_1$ (Line 3). SerialDPEnum then joins these best QEPs to form larger QEPs, and iteratively joins those QEPs together to form successively larger QEPs. Each QEP can be characterized by the set of tables, (or quantifiers), that have been accessed and joined by that QEP. QEPs for a given quantifier set are maintained in an in-memory quantifier set table (often called MEMO). Each entry in MEMO contains a list of QEPs for a quantifier set, and the entry typically is located by hashing the quantifier set.

To produce a QEP representing quantifier sets of size S, SerialDPEnum successively generates and then joins quantifier sets smallQS and largeQS of size smallSZ and largeSZ=S−smallSZ, respectively, where smallSZ can vary from 1 up to half the size of S ([S/2]). At each iteration, subroutine CreateJoinPlans does the bulk of the work, generating and estimating the cost of all join QEPs between the two given sets of quantifiers, smallQS, and largeQS, including QEPs in which either quantifier set is the outer-most (left input to the join) and alternative join methods (Line 13). SerialDPEnum iteratively increases the size S of the resulting quantifier set until it obtains the optimal QEP for all N quantifiers in the query.

| Method 1: SerialDPEnum |
|---|
| Input: a connected query graph with quantifiers $q_1, \ldots, q_N$ |
| Output: an optimal bushy join tree |
| 1:   for i ← 1 to N |
| 2:       Memo[{$q_i$}] ← CreateTableAccessPlans($q_i$); |
| 3:       PrunePlans(Memo[{$q_i$}]); |
| 4:   for S ← 2 to N |
| 5:       for smallSZ ← 1 to [S/2] |
| 6:           largeSZ ← S − smallSZ; |
| 7:           for each smallQS of size smallSZ |
| 8:               for each largeQS of size largeSZ |
| 9:                   if smallQS ∩ largeQS ≠ 0 then |
| 10:                      continue; /* discarded by the disjoint filter */ |
| 11:                  if not smallQS connected to largeQS then |
| 12:                      continue; /* discarded by the connectivity filter */ |
| 13:                  ResultingPlans ← CreateJoinPlans(Memo[smallQS], Memo[largeQS]); |
| 14:                  PrunePlans(Memo[smallQS ∪ largeQS], ResultingPlans); |
| 15:  return Memo[{$q_1, \ldots, q_N$}]; |

In some embodiments, before calling CreateJoinPlans, SerialDPEnum first checks whether the two quantifier sets smallQS and largeQS can form a feasible join. To do so, a series of filters are executed. Two of the filters are a disjoint filter (in Line 9) and a connectivity filter (in Line 11). The disjoint filter ensures that the two quantifier sets smallQS and largeQS are disjoint. The connectivity filter verifies that there is at least one join predicate that references quantifiers in smallQS and largeQS. Disabling the connectivity filter permits Cartesian products in the resulting QEPs. Note that the DP formulation in SerialDPEnum is a non-serial polyadic formulation, since SerialDPEnum has two recursive subproblems (polyadic) (in Line 13), and sub-problems depend on all preceding levels (non-serial) (loop beginning on Line 5).

In one embodiment of a method for parallel QEP generation, in order to achieve linear speed-up in parallel DP join enumeration, the method (1) partitions the search space relatively evenly among threads, and (2) processes each partition independently without any dependencies among threads. The key insight for realizing this result is that in DP-based join enumeration, each sub-problem depends only on the results of all preceding levels. By partitioning sub-problems by their sizes—or, more precisely, the sizes of the resulting quantifier sets—sub-problems of the same resulting size are mutually independent. Furthermore, as the number of quantifiers increases, the number of sub-problems of the same size grows exponentially. This is especially true for star and clique queries, which will benefit most from parallel execution. In addition, each sub-problem of size S is constructed using any combination of one smaller sub-problem of size smallSZ and another sub-problem of size largeSZ, such that S=smallSZ+largeSZ. Thus, the partitioned sub-problems of the same resulting size can be further grouped by the sizes of their two smaller sub-problems. In this way, sub-problems of the same size are solved by executing joins between their smaller sub-problems. With this approach, the join enumeration problem can be transformed into multiple theta joins, called multiple plan joins (MPJs), in which the disjoint and connectivity filters constitute the join conditions. Each MPJ is then parallelized using multiple threads without any dependencies between the threads. Thus, by judiciously allocating to threads portions of the search space for MPJ, the method achieves linear speed-up.

To illustrate this more concretely, regard the MEMO table as a plan relation table 304 with two attributes, QS and PlanList. This plan relation is horizontally partitioned (by construction) into several partitions 306 according to the size of the quantifier set QS. Thus, each partition of the plan relation table 304, called a plan partition, has only tuples whose QS attributes are of same size. Let $P_S$ denote the plan partition containing all quantifier sets of size S. A hash index is maintained on the QS column to efficiently find the tuple in the plan relation table 304 having a given quantifier set. The plan partition $P_S$ is generated by performing $\lfloor S/2 \rfloor$ joins from the start join between $P_1$ and $P_{S-1}$ to the end join between $P_{\lfloor S/2 \rfloor}$ and $P_{S-\lfloor S/2 \rfloor}$. FIG. 3 shows the plan relation table 304 for a query graph G 302. Since query graph G 302 has four quantifiers, four plan partitions 306 are created, $P_1 \sim P_4$.

Method 2 outlines one embodiment of a parallelized join enumeration method, called ParallelDPEnum. Parts of the MPJ search space are allocated to m threads (Line 5), each of which then executes its allocated MPJs in parallel (Line 7). Here, one of two different flavors of MPJ may be used, depending on whether an SVA is used or not. Both types of MPJ are useful, depending on the sizes of the plan partitions. If the SVA is not exploited, at Line 7 the "basic" flavor of MPJ without SVAs is invoked. Otherwise, at Line 7 the "enhanced" type of MPJ that exploits SVAs is invoked, which will be further explained in relation to FIGS. 8 and 9.

Once this parallel execution of MPJs for each size of quantifier sets is completed, the results are merged and expensive QEPs in the plan partition are pruned (Line 9). Then, if the SVA-enhanced MPJs are invoked, an SVA for the plan partition is constructed, as will be described in relation to FIGS. 8 and 9, to be exploited in subsequent MPJs. Note that the unit of allocation to threads in the SVA-enhanced MPJ is a pair of partitioned SVAs, whereas the unit of allocation to threads in the basic MPJ (without SVAs) is a pair of tuples.

In one embodiment, elements in a quantifier set are assumed to be sorted in increasing order of their quantifier numbers, and thus sets can be regarded as strings. In some embodiments, each plan partition is sorted in lexicographical order of the quantifier sets.

Method 2: ParallelDPEnum

Figure 4:
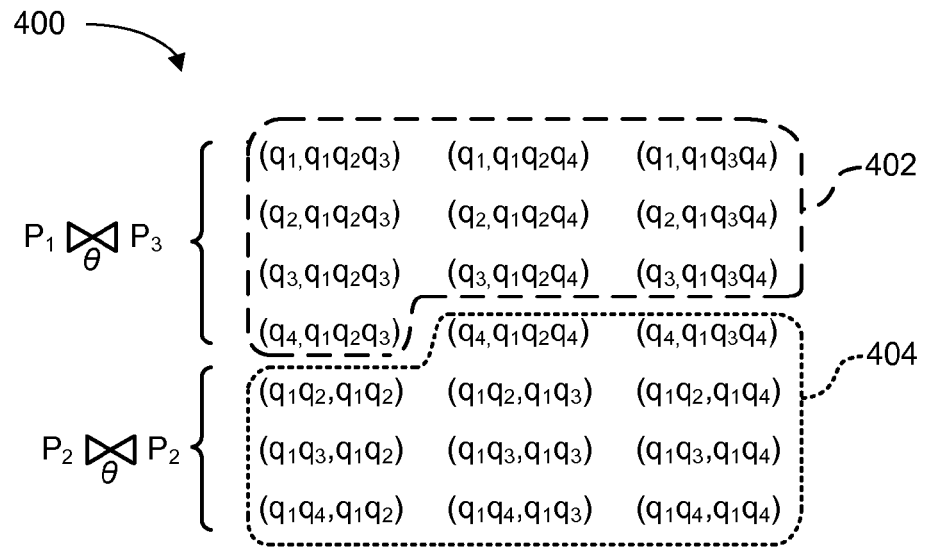
FIG. 4 depicts one embodiment of a total sum allocation method for assigning parts of the search space of FIG. 3 to threads.

Input: a connected query graph with quantifiers $q_1, \ldots, q_N$
Output: an optimal bushy join tree
1:   for i ← 1 to N
2:     Memo[{$q_i$}] ← CreateTableAccessPlans($q_i$);
3:     PrunePlans(Memo[{$q_i$}]);
4:   for S ← 2 to N Method 2: ParallelDPEnum 5:     SSDVs ← AllocateSearchSpace (S, m);  /* SSDVs: search space description vectors allocated for m threads */
6:     for i ← 1 to m /* Execute m threads in parallel */
7:       threadPool.SubmitJob(MultiplePlanJoin(SSDVs[i], S));
8:     threadPool.sync( );
9:     MergeAndPrunePlanPartitions(S);
10:    for i ← 1 to m
11:      threadPool.SubmitJob( BuildSkipVectorArray(i) );
12:    threadPool.sync( );
13: return Memo[{$q_1, \ldots, q_N$}];

FIG. 4 depicts one embodiment of a total sum allocation method 400 for assigning parts of the search space of FIG. 3 to threads. In one embodiment, to parallelize the MPJ for $P_S$, parts of the search space for the MPJ are assigned to threads. This step is called search space allocation. There are many possible ways to perform this allocation. For example, the MPJ for $P_4$ in FIG. 3 executes two plan joins, one between $P_1$ and $P_3$, and the other join between $P_2$ and $P_2$. FIG. 4 illustrates a method 400 for relatively evenly allocating all possible pairs of quantifier sets to two threads, thread 1 402 and thread 2 404. This method 400 has the advantage of appearing to balance the workload (thread 1 402 has 10 pairs, and thread 2 404 has 11 pairs).

In this particular case, however, thread 2 402 will never invoke CreateJoinPlans, because all of its pairs will be discarded by the disjoint filter as infeasible. Thus, this seemingly even allocation unfortunately would result in seriously unbalanced workloads. Consequently, other methods for allocating search spaces to threads are described in relation to FIGS. 5-7. Note also that, as the number of quantifiers increases, the number of times the disjoint filter is invoked increases exponentially, dominating the join enumerator's performance. To reduce the load imposed by the disjoint filter, a skip vector array (SVA) minimizes the number of unnecessary invocations of the disjoint filter along with an embodiment of MPJ that exploits the SVA are described in relation to FIGS. 8 and 9.

In general, when building the plan partition $P_S$ in MPJ, there are $\lfloor S/2 \rfloor$ plan joins. Thus, the size of the search space for building $P_S$ is $\Sigma_{smallSZ=1}^{\lfloor S/2 \rfloor}(|P_{smallSZ}| \times |P_{S-smallSZ}|)$. Given m threads, using a total sum allocation method 400, the search space is equally divided into m smaller search spaces, and the m smaller search spaces are each allocated to one of the m threads. Each thread T, executes MPJ for the i-th search space allocated. FIG. 4 shows two allocated search spaces for building $P_4$ using total sum allocation.

The total sum allocation method 400 is useful when the number of CreateJoinPlans is evenly distributed among threads. However, depending on the topologies of the query graph, each plan join in the MPJ may invoke a considerably different number of CreateJoinPlans. An alternative method approach is stratified allocation, described in several different embodiments in relation to FIGS. 5-7.

Figure 5:
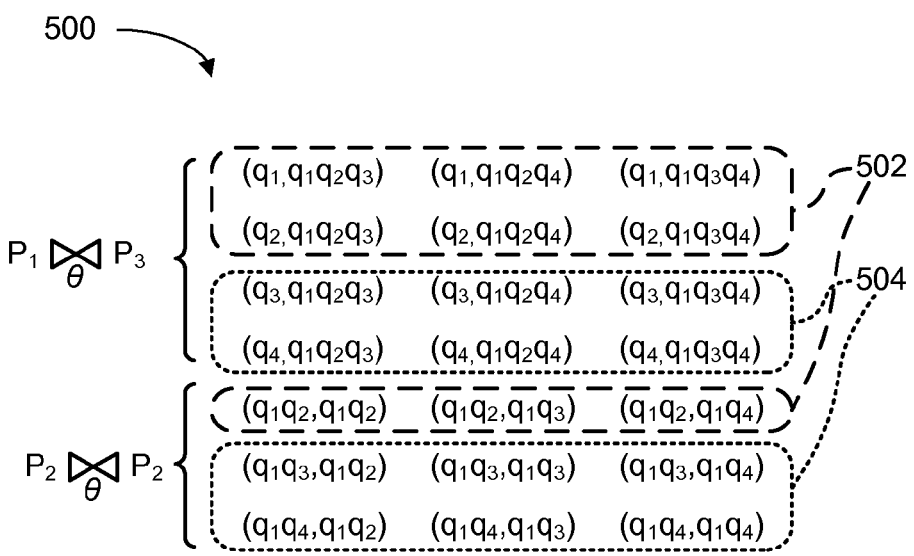
FIG. 5 depicts one embodiment of an equi-depth allocation method for allocating parts of the search space of FIG. 3 to threads.

FIG. 5 depicts one embodiment of an equi-depth allocation method 500 for allocating parts of the search space of FIG. 3 to threads 502, 504. The equi-depth allocation method 500 is a form of stratified allocation. Stratified allocation divides the search space of MPJ for PS into smaller strata, and then applies an allocation scheme to each stratum. Each stratum corresponds to the search space of one plan join in MPJ, and thus the number of strata is $\lfloor S/2 \rfloor$. Stratified allocation more evenly spreads the number of actual CreateJoinPlans invocations among threads 502, 504 than does total sum allocation.

In one embodiment of the equi-depth allocation method 500, given m threads, equi-depth allocation divides the whole range of the outer loop in each plan join between PsmallSZ and PlargeSZ into smaller contiguous ranges of equal size. In other words, in the equi-depth allocation method 500, each thread loops through a range of size $$\frac{|P_{smallSZ}|}{m}$$

in the outer loop. The equi-depth allocation method 500 is useful when the size of the outer is divisible by the number of threads, and the number of invocations of CreateJoinPlans are similar for contiguous and equally-partitioned ranges.

Figure 6:
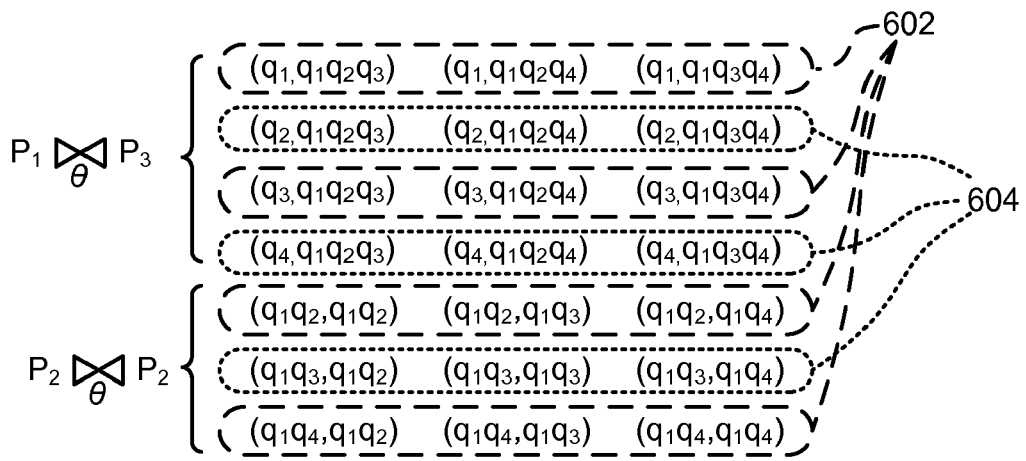
FIG. 6 depicts one embodiment of a round-robin outer allocation method for allocating parts of the search space of FIG. 3 to threads.

FIG. 6 depicts one embodiment of a round-robin outer allocation method 600 for allocating parts of the search space of FIG. 3 to threads 602, 604. The round-robin outer allocation method 600 is a form of stratified allocation. Given m threads, the round-robin outer allocation method 600 logically assigns the k-th tuple in the outer partition to thread k mod m. As with the equi-depth allocation method 500, each thread loops through a range of size $$\frac{|P_{2mallSZ}|}{m}$$

in the outer loop.

In one embodiment of the round-robin outer allocation method 600, outer tuples are distributed randomly across threads 600, 602. Thus, this allocation scheme works well even when there is skew in the number of CreateJoinPlans invocations for different outer rows in the plan join. However, as in star queries, if the number of outer tuples is small and is not divisible by m, then some threads will have an extra outer tuple, and hence would invoke a considerably larger percentage of CreateJoinPlans than those without that extra row.

Figure 7:
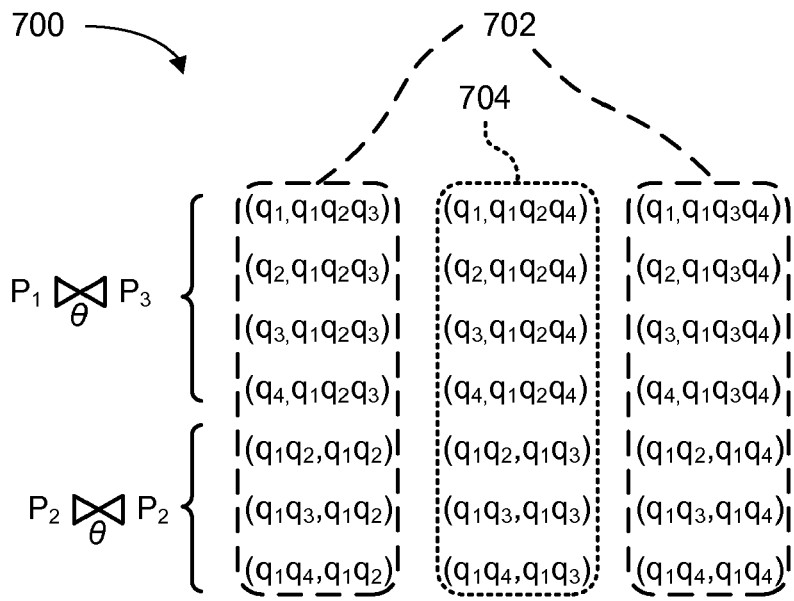
FIG. 7 depicts one embodiment of a round-robin inner allocation method for allocating parts of the search space of FIG. 3 to threads.

FIG. 7 depicts one embodiment of a round-robin inner allocation method 700 for allocating parts of the search space of FIG. 3 to threads 702, 704. The round-robin inner allocation method 700 is a form of stratified allocation. Given m threads, the round-robin inner allocation method 700 logically assigns a join pair $(t_i, t_j)$ to thread (j mod m), where $t_j$ is the j-th tuple in the inner plan partition. Unlike the other allocation methods 400, 500, 600, each thread using the round-robin inner allocation method 700 loops through the entire range of the outer loop of MPJ, but inner tuples are distributed randomly across threads. This has an effect similar to randomly distributing all join pairs in a plan join across threads. Therefore, the round-robin inner allocation method 700 provides the most uniform distribution of CreateJoinPlans invocations among threads, regardless of query topologies.

Since, in one embodiment, the MPJ method is executed in memory, the method may be very cache conscious to make the best use of the CPU's cache. One embodiment of MPJ is therefore based upon a block nested-loop join, which is considered to be a relatively fast, cache-conscious, in-memory join, and tuples are physically clustered in plan partitions using arrays. The join enumerators of conventional optimizers effectively use a tuple-based nested-loop method and are less cache conscious, so suffer more cache misses, especially for large plan partitions. Note that those join enumerators were developed before cache-conscious techniques emerged. In a block-nested loop join of relations $R_1$ and $R_2$, the inner relation $R_2$ is logically divided into blocks, and then, for each block B in the relation $R_2$, it performs the tuple-based nested-loop join over B and the outer relation $R_1$.

In one embodiment, a search space description vector (SSDV) represents an allocated search space for each thread. The SSDV is computed according to the chosen search space allocation scheme described above in relation to FIGS. 4-7. Each entry in the SSDV gives the parameters for one problem to be allocated to a thread, in the form of a quintuple: ⟨(smallSZ, [stOutIdx,stBlkIdx,stBlkOff], [endOutIdx,endBlkIdx,endBlkOff], outInc, inInc)⟩. Here, smallSZ corresponds to a plan join between $P_{smallSZ}$ and $P_{S-smallSZ}$; [stOutIdx,stBlkIdx,stBlkOff] specifies the start outer tuple index, the start block index, and the offset of the start inner tuple in the block; [endOutIdx,endBlkIdx,endBlkOff] gives the end outer tuple index, the end block index, and the offset of the end inner tuple in the block; and outInc and inInc specify increasing step sizes for the loops over the outer and inner plan partitions, respectively.

For example, recall FIG. 4 where a total sum allocation method 400 is used. For ease of explanation, let the block size be the size of the inner plan partition (=tuple-based nested loop). The SSDV for thread 1 is {⟨1, [1,1,1], [4,1,1], 1, 1⟩, ⟨2, [−1,−1,−1], [−1,−1,−1], 1, 1⟩}. The first entry in the SSDV represents the first 10 pairs as shown in FIG. 4. Since thread 1 402 does not execute a plan join between $P_2$ and $P_2$, ranges in the second entry are set to [−1,−1,−1]. The SSDV for thread 2 404 is {⟨1, [4,1,2], [4,1,3], 1, 1⟩, ⟨2,[1,1,1], [3,1,3]1,1⟩}. The first entry represents the 11th and 12th pairs, and the second represents all 9 pairs for a plan join between $P_2$ and $P_2$.

Method 3 represents one embodiment of a basic MultiplePlanJoin (MPJ) that can be used with the various allocation schemes discussed in relation to FIGS. 4-7. The inputs of the method are an SSDV and the size S of quantifier sets for the plan partition to build. The loop iterates over the SSDV, calling PlanJoin. In PlanJoin, the first loop iterates over blocks in the inner plan partition $P_{S-smallSZ}$. The second loop iterates over tuples in the outer plan partition $P_{smallSZ}$. The last loop iterates over tuples in the current block of the outer relation. According to the current block number and the current offset, ranges for outer tuples (Line 5) and the offsets for inner tuples in the block (Line 7) are computed. When smallSZ=largeSZ, a simple optimization called NoInnerPreceding may be invoked, since the plan join becomes a self-join. In other words, the method skips any cases where the index of the inner tuple $t_i \leq$ that of the outer tuple $t_o$.

---

Method 3: MultiplePlanJoin

Input: SSDV, S
1:    for i ← 1 to ⌊S/2⌋
2:        PlanJoin (SSDV [i], S);
Function PlanJoin
Input: ssdvElmt, S
1:    smallSZ ← ssdvElmt.smallSZ;
2:    largeSZ ← S − smallSZ;
3:    for blkIdx ← ssdvElmt.stBlkIdx to ssdvElmt.endBlkIdx
4:        blk ← blkIdx-th blick in $P_{largeSZ}$;
5:        ⟨stOutIdx, endOutIdx⟩ ←
          GetOuterRange(ssdvElmt, blkIdx);
6:        for $t_o$ ← $P_{smallSZ}$[stOutIdx] to $P_{smallSZ}$[endOutIdx]
          step by ssdvElmt.outInc
7:          ⟨stBlkOff, endBlkOff⟩ ← GetOffsetRangeInBlk(ssdvElmt, blkIdx, offset of $t_o$);
8:          for $t_i$ ← blk[stBlkOff] to blk[endBlkOff]
          step by ssdvElmt.inInc
9:            if $t_o$.QS ∩ $t_i$.QS ≠ 0 then continue;
10:          if not ($t_o$.QS connected to $t_i$.QS) then continue;

-continued

| Method 3: MultiplePlanJoin |
| --- |
| 11:        ResultingPlans ← CreateJoinPlans($t_o$, $t_i$); |
| 12:        PrunePlans($P_S$, ResultingPlans); |

Figure 8:
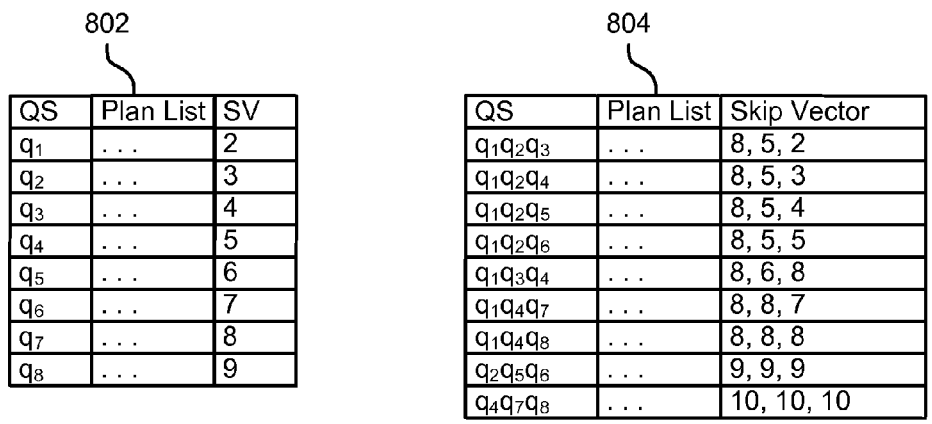
FIG. 8 depicts two example skip vector arrays (SVAs).

FIG. 8 depicts two example SVAs 802, 804. SVAs 802, 804 indicate which quantifier sets should be skipped to avoid unnecessary invocation of the disjoint filter.

One embodiment of the basic MPJ described above in relation to FIG. 7 requires invoking the disjoint filter for all possible pairs of tuples in the inner and outer plan partitions. Furthermore, as the number of quantifiers increases, the number of these disjoint filter invocations increases exponentially, especially in star queries, dominating the overall performance.

The SVA avoids unnecessary invocations of the disjoint filter, through fast retrieval of disjoint quantifier sets for a given quantifier set. The SVA can also benefit serial DP enumeration. Quantifier sets, in one embodiment, are represented as text strings. For example, a quantifier set $\{q_1; q_3; q_5\}$ is represented as a string $q_1 q_3 q_5$.

In one embodiment, the SVA is formed from a list of skip vectors. Each skip vector is an array of skip indexes, where each skip index represents the index of the quantifier set $q_s$ to be compared next in a plan partition. To cluster overlapping quantifier sets in plan partitions, quantifiers in the query graph are numbered in depth-first order, starting from the node having the maximum number of outgoing edges. For example, the hub node in a star query is numbered one, since it has the maximum number of outgoing edges.

Each skip vector can be embedded within a plan partition, since the plan partition is also sorted in lexicographical order. Let $P_S[i].SV[j]$ represent the j-th skip index of the i-th skip vector in a plan partition $P_S$. The i-th quantifier set in $P_S$ is denoted by $P_S[i].QS$. Then, $P_S[i].SV[j]$ is defined as min $\{k|P_S[i].QS[j]$ does not overlap $P_S[k].QS; k>i\}$ For example, consider an SVA for a plan partition $P_3$ 804 in FIG. 8. The SVA 804 is embedded in the plan partition as the third column. Consider the first entry of the first skip vector $P_3[1].SV[1]$, which is 8. This indicates that, if any element of a given quantifier set $q_s$ being compared is the same as the first element (=$q_1$) of $P_3[1].QS$, then QS is needed to compare with the eighth quantifier set $P_3[8].QS$. Therefore, the second to the seventh quantifier sets in P3 do not need to be compared, and the disjoint filter and the associated processing can be avoided.

If the plan partition is sorted in lexicographical order, the SVA can be constructed in linear time, whenever the number of quantifiers in a query graph is constant. To compute the indexes for skip vectors efficiently, one embodiment of the method BuildSkipVectorArray constructs skip vectors backwards, that is, from the last skip vector to the first one. For example, suppose that the i-th skip vector $P_S[i].SV$ of $P_S$ is being constructed. In this case, skip vectors up to the (i+1) of $P_S$ have already been constructed. If $P_S[i].QS[j]$ does not overlap $P_S[i+1].QS$, then i+1 is assigned to $P_S[i].SV[j]$. Otherwise,—i.e., if $P_S[i].QS[j]$ is equal to $P_S[i+1].QS[l]$ for some $l$ —$P_S[i+1].SV[l]$ is assigned to $P_S[i].SV[j]$. For example, consider $P_3[4].SV.P_3[5].SV[1](=8)$ is assigned to $P_3[4].SV[1]$, since $P_3[4].QS[1] (=q_1)$ is equal to $P_3[5].QS[1]$. 5 is assigned to $P_3[4].SV[2]$, since $P_3[4].QS[2](=q_2)$ does not overlap $P_3[5].QS (=q_1 q_3 q_4)$. Similarly, 5 is assigned to $P_3[4].SV[3]$. Since quantifier sets are lexicographically ordered, the time complexity of constructing a skip vector is O(S).

Figure 9:
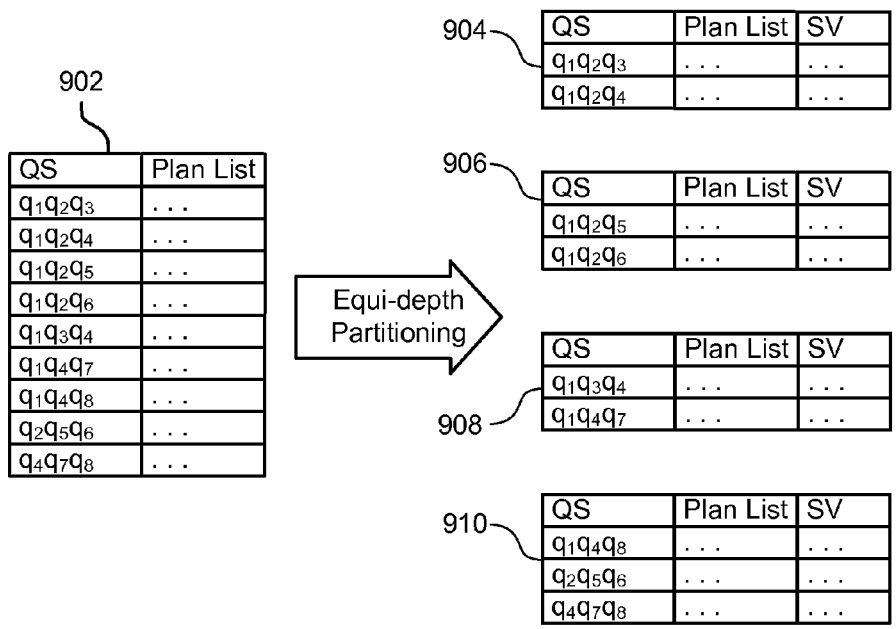
FIG. 9 depicts one embodiment of a plan partition partitioned into partitioned SVAs using equi-depth partitioning.

FIG. 9 depicts one embodiment of a plan partition 902 partitioned into partitioned SVAs 904, 906, 908, 910 using equi-depth partitioning. In certain embodiments, to use a pair of partitioned SVAs as the unit of allocation to threads, each plan partition is further partitioned into sub-partitions. To support MPJ with SVA using total sum allocation or equi-depth allocation, the plan partition is partitioned using equi-depth partitioning. To support MPJ with SVA using round-robin inner or outer allocation, the plan partition is partitioned using round-robin partitioning.

In one embodiment, the total number of sub-partitions for a plan partition is a multiple of the number of threads, in order to assign an equal number of sub-partitions pairs to threads when NoInnerPreceding optimization is used. The j-th sub-partition of $P_S$ is denoted as $P_{\{S,j\}}$. Next, the SVAs for all the sub-partitions are built. Here, for fast clustered access, skip vectors are embedded within sub-partitions.

In the illustrated embodiment, the plan partition 902 is partitioned into four sub-partitions, $P_{\{3,1\}}$ 904, $P_{\{3,2\}}$ 906, $P_{\{3,3\}}$ 908, and $P_{\{3,4\}}$ 910. The SVA generator 210 builds embedded SVAs for the four sub-partitions.

Method 4 represents the enhanced MPJ method, MultiplePlanJoinWithSVA, that exploits SVAs. The inputs of the method are an SSDV and the size S of quantifier sets for the plan partition to build. The loop iterates over the SSDV, calling PlanJoinWithSVA. In PlanJoinWithSVA, the first loop iterates over sub-partitions in the outer plan partition, PsmallSZ. The second loop iterates over sub-partitions in the inner plan partition PlargeSZ and invokes Skip Vector Join SVJ subroutine, described in Method 5, for $P_{\{smallSZ, outerPartIdx\}}$ and $P_{\{largeSZ, innerPartIdx\}}$.

| Method 4: MultiplePlanJoinWithSVA |
| --- |
| Input: SSDV, S |
| 1:    for i ← 1 to ⌊S/2⌋ |
| 2:        PlanJoinWithSVA (SSDV [i], S); |
| Function PlanJoinWithSVA |
| Input: ssdvElmt, S |
| 1:    smallSZ ← ssdvElmt.smallSZ; |
| 2:    largeSZ ← S − smallSZ; |
| 3:    for outerPartIdx ← ssdvElmt.stOuterPartIdx to ssdvElmt.endOuterPartIdx step by ssdvElmt.outInc |
| 4:        ⟨stInnerPartIdx, endInnerPartIdx⟩ ← GetInnerRange(ssdvElmt, outerPartIdx); |
| 5:        for innerPartIdx ← stInnerPartIdx to endInnerPartIdx step by ssdvElmt.inInc |
| 6:            outerPartSize ← \|$P_{\{smallSZ,\ outerPartIdx\}}$\|; |
| 7:            innerPartSize ← \|$P_{\{largeSz,\ innerPartIdx\}}$\|; |
| 8:            SVJ(⟨$P_{\{smallSZ,\ outerPartIdx\}}$, 1, outerPartSize⟩, ⟨$P_{\{largeSZ,\ innerPartIdx\}}$, 1, innerPartSize⟩); |

Note that there are two differences between the embodiment described in MultiplePlanJoin (Method 3) and the embodiment described in MultiplePlanJoinWithSVA (Method 4). First, MultiplePlanJoinWithSVA uses loops over sub-partitions, whereas MultiplePlanJoin uses loops over tuples. Secondly, MultiplePlanJoinWithSVA invokes the Skip Vector Join subroutine for each inner and outer sub-partition to skip over partitions that won't satisfy the disjoint filter, whereas MultiplePlanJoin performs a block nested-loop join on all pairs, resulting in many unnecessary invocations of the disjoint filter. Apart from these differences, the two methods are equivalent.

Method 5 defines one embodiment the Skip Vector Join (SVJ) subroutine, which is an indexed join for two sub-partitions exploiting their embedded SVAs. The inputs of the method are (a) the inner/outer sub-partitions $P_{\{smallSZ, outerPartIdx\}}$ (=$R_1$) and $P_{\{largeSZ, innerPartIdx\}}$ (=$R_2$), (b) the start indexes $idx_{R1}$ and $idx_{R2}$ of tuples in $R_1$ and $R_2$, respectively, and (c) the end indexes $endIdx_{R1}$ and $endIdx_{R2}$ of $R_1$ and $R_2$, respectively. SVJ checks whether two tuples are disjoint (Lines 3-4). If so, SVJ invokes the connectivity filter and generates join results (Lines 5-7). After that, SVJs are recursively called to join all remaining join pairs of the two sub-partitions (Lines 8-9). If the two tuples are not disjoint, skip indexes are obtained for the first overlapping element (Lines 11-15). Then, the QEP parallel optimizer 106 skips overlapping pairs using the skip indexes obtained, and recursively calls SVJs (Lines 16-17).

So SVJ is much faster than the other two join methods for joins over large plan partitions. Note also that the SVA can be used for both one-index and two-index joins.

Figure 10:
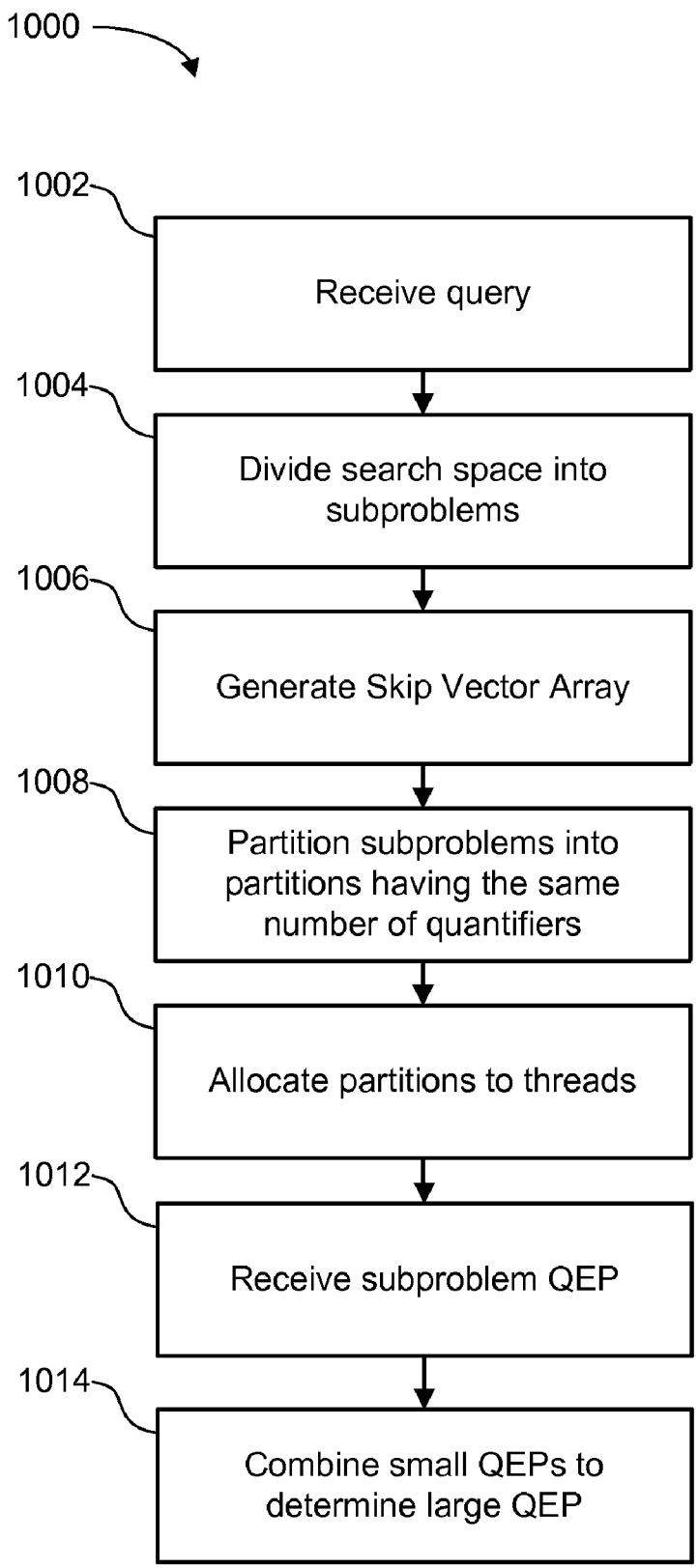
FIG. 10 is a flowchart diagram depicting one embodiment of a method for generating an optimal QEP for a query.

FIG. 10 is a flowchart diagram depicting one embodiment of a method 1000 for generating an optimal QEP for a query. The query receiver 108 receives 1002 a query for which a QEP is to be generated. The QEP parallel optimizer 106 divides 1004 the search space into subproblems. The SVA generator 210 generates 1006 one or more SVAs for quantifier sets. Each SVA consists of skip indices that indicate which parts of a plan partition should be skipped to minimize unnecessary analysis of disjoint pairs.

Method 5: SVJ (Skip Vector Join)

Input: ⟨$P_{\{smallSZ, outerPartIdx\}}$(=$R_1$), $idx_{R1}$, $endIdx_{R1}$⟩,
⟨$P_{\{largeSZ, innerPartIdx\}}$(=$R_2$), $idx_{R2}$, $endIdx_{R2}$⟩

```
1:   S ← smallSZ + largeSZ;
2:   if idx_R1 ≤ endIdx_R1 and idx_R2 ≤ endIdx_R2 then
3:     overlapQS ← R_1[idx_R1].QS ∩ R_2[idx_R2].QS;
4:     if overlapQS = 0 then /*the case for join*/
5:       if (R_1[idx_R1].QS connected to R_2[idx_R2].QS) then
6:         ResultingPlans ← CreateJoinPlans(R_1[idx_R1], R_2[idx_R2]);
7:         PrunePlans(P_s, ResultingPlans);
8:       SVJ(⟨R_1, idx_R1 + 1, endIdx_R1⟩, ⟨R_2, idx_R2, endIdx_R2⟩);
9:       SVJ(⟨R_1, idx_R1, idx_R1⟩, ⟨R_2, idx_R2 + 1, endIdx_R2⟩);
10:    else /* the case for skip */
11:      elmt ← FirstElmt(overlapQS);
12:      lvl_R1 ← GetLevel(R_1[idx_R1].QS, elmt);
13:      lvl_R2 ← GetLevel(R_2[idx_R2].QS, elmt);
14:      jpIdx_R1 ← R_1[idx_R1].SV[lvl_R1];
15:      jpIdx_R2 ← R_2[idx_R2].SV[lvl_R2];
16:      SVJ(⟨R_1, jpIdx_R1, endIdx_R1⟩, ⟨R_2, idx_R2, endIdx_R2⟩);
17:      SVJ(⟨R_1, idx_R1, min(jpIdx_R1 - 1, endIdx_R1)⟩, ⟨R_2, jpIdx_R2, endIdx_R2⟩);
```

As an example of one embodiment of SVJ, consider the SVJ for plan partitions $P_1$ 802 and $P_3$ 804 exploiting their SVAs in FIG. 8. Suppose that SVJ(⟨$P_1$, 1, 8⟩, ⟨$P_3$, 1, 9⟩) is invoked. Since the first entries of the partitions overlap ($q_1$ and $q_1q_2q_3$), the QEP parallel optimizer 106 skips to the second entry of the first partition using $P_1$[1].SV [1](=2) and skips to the eighth entry of the second partition using $P_3$[1].SV [1] (=8). The QEP parallel optimizer 106 then recursively calls SVJ(⟨$P_1$, 2, 8⟩, ⟨$P_3$, 1, 9⟩) and SVJ(⟨$P_1$, 1, 1⟩, ⟨$P_3$, 8, 9⟩). For SVJ(⟨$P_1$, 1, 1⟩, ⟨$P_3$, 8, 9⟩), since the first entry in $P_1$ and the eighth entry in $P_3$ are disjoint, the two quantifiers are joined, and then SVJ(⟨$P_1$, 2, 1⟩, ⟨$P_3$, 8, 9⟩) and SVJ(⟨$P_1$, 1, 1⟩, ⟨$P_3$, 9, 9⟩) are recursively called In an alternative embodiment, SVJ is implemented using inverted indexing techniques used for documents to efficiently determine overlapping quantifier sets for a given quantifier set $q_s$. In this approach, sets are treated as documents, and elements as keywords. Corresponding inverted list for each quantifier in $q_s$ are computed. Next, all of these inverted lists are UNIONED, that is, all overlapping sets. By then accessing the complement of the UNIONed set, all disjoint sets for $q_s$ are found. By storing inverted lists as bitmaps, the complement of the UNIONed set is obtained. The alternative SVJ executes bit operations to find bits having 0 from the UNIONed set. Given two partitions $P_{smallSZ}$ and $P_{largeSZ}$, the time complexity of this inverted-index scheme is $O(|P_{smallSZ}| \times smallSZ \times I_{largeSZ})$, where smallSZ is the size of the quantifier set in $P_{smallSZ}$ and $I_{largeSZ}$ is the size of the inverted list for $P_{largeSZ}$. Observe that $I_{largeSZ}$ is in proportion to $|P_{largeSZ}|$. The time complexity of the basic MPJ is $O(|P_{smallSZ}| \times |P_{largeSZ}|)$. Thus, the inverted-index variant of MPJ outperforms the basic MPJ when $|P_{largeSZ}| > smallSZ \times |I_{largeSZ}|$. The time complexity of SVJ is O(# of disjoint pairs).

The partitioner 204 partitions 1008 the subproblems into partitions having the same number of quantifiers. By partitioning 1008 the subproblems into partitions having the same number of quantifiers, the partitions can be analyzed independently, since sub-problems having the same number of quantifiers are mutually independent. As a result, the partitions are allocated 1010 to independent threads for analysis.

The QEP parallel optimizer 106 receives 1012 from each thread a subproblem QEP that represents the optimal QEP for the subproblem. These subproblem, or "small" QEPs are then combined 1014 to form a larger QEP. The QEP parallel optimizer 106 combines 1014 small QEPs recursively to determine a QEP for the query.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including operations to receive a query for which a QEP is to be computed, divide a search space into a plurality of subproblems for which constituent QEPs are to be created, partition the plurality of subproblems into a plurality of partitions, and allocate each of the plurality of partitions to a thread of a plurality of threads within a multiple thread architecture. The set of possible QEPs for the query describes a search space. Each subproblem references one or more quantifiers and each of the subproblems within a partition references the same number of quantifiers. A partition containing subproblems referencing fewer quantifiers is executed before a partition containing subproblems referencing more quantifiers.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can store the program for use by or in connection with the instruction execution system, apparatus, or device.

The computer-useable or computer-readable storage medium can be an electronic, magnetic, optical, electromagnetic, infrared, or semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product comprising a non-transitory computer useable storage medium to store a computer readable program, wherein the computer readable program, when executed on a computer, causes the computer to perform operations comprising:
receiving a query for which a query execution plan (QEP) is to be computed, wherein a set comprising all possible QEPs for the query describes a search space, wherein each QEP of the set references a plurality of quantifiers;
dividing the search space into a plurality of subproblems for which constituent QEPs referencing a smaller number of quantifiers are to be created;
generating a skip vector array (SVA) that indicates disjoint quantifier sets between two subproblems;
partitioning the plurality of subproblems into a plurality of partitions, wherein each of the subproblems within a partition references the same number of quantifiers;
allocating each of the plurality of partitions to a thread of a plurality of threads within a multiple thread architecture, wherein a partition containing subproblems referencing fewer quantifiers is executed before a partition containing subproblems referencing more quantifiers;
receiving from each of the plurality of threads a constituent QEP for each subproblem; and
combining two constituents QEPs at the QEP optimizer server to determine a QEP referencing the combined set of quantifiers for the two constituent QEPs.

2. The computer program product of claim 1, wherein combining the two constituent QEPs comprises:
generating alternative QEPs for combining the constituent QEPs;
calculating a cost for executing the generated QEPs; and
pruning any generated QEPs having a higher cost than other generated QEPs referencing the same set of quantifiers.

3. The computer program product of claim 1, further comprising determining if quantifiers of the two constituent QEPs are disjoint and filtering the combination of QEPs in response to determining that the quantifiers of the two quantifiers QEPs are not disjoint.

4. The computer program product of claim 1, further comprising determining that there exists at least one join predicate that references a quantifier in each of the constituent QEPs of the possible QEP combination.

5. The computer program product of claim 1, wherein:
a number of quantifiers of a group comprising multiple subproblems is a predetermined size; and
partitioning the plurality of subproblems into the plurality of partitions comprises joining a first smaller subproblem and a second smaller subproblem such that the size of the sum of the quantifiers in the first and second smaller subproblems is the predetermined size.

6. The computer program product of claim 1, wherein partitioning the plurality of subproblems into a plurality of partitions comprises approximately equally dividing the search space into a plurality of smaller search spaces and allocating each of the smaller search spaces to a partition.

7. The computer program product of claim 1, wherein allocation of the plurality of partitions is executed in response to determining that the number of quantifiers referenced by the query exceeds a threshold.

8. A computer-implemented method comprising:
receiving a query for which a query execution plan (QEP) is to be computed by a QEP optimizer server, wherein a set comprising all possible QEPs for the query describes a search space, wherein each QEP of the set of possible QEPs references a plurality of quantifiers;
dividing the search space into a plurality of subproblems for which constituent QEPs referencing a smaller number of quantifiers are to be created at the QEP optimizer server;
generating a skip vector array (SVA) that indicates disjoint quantifier sets between two subproblems at the QEP optimizer server;

partitioning the plurality of subproblems into a plurality of partitions at the QEP optimizer server, wherein each of the subproblems within a partition references the same number of quantifiers, and wherein subproblems that are indicated as not disjoint by the SVA are excluded from the plurality of partitions;

allocating each of the plurality of partitions to a thread of a plurality of threads within a multiple thread architecture at the QEP optimizer server, wherein a partition containing subproblems referencing fewer quantifiers is executed before a partition containing subproblems referencing more quantifiers;

receiving from each of the plurality of threads a constituent QEP for each subproblem at the QEP optimizer server; and combining two constituent QEPs at the QEP optimizer server to determine a QEP referencing the combined set of quantifiers for the two constituent QEPs.

9. The computer-implemented method of claim 8, wherein the SVA is an array of skip indexes, and wherein each skip index represents an index of a quantifier set (qs) to be compared in a plan partition.

10. The computer-implemented method of claim 9, further comprising numbering quantifiers in each quantifier set in depth-first order at the QEP optimizer server, starting from the node having the maximum number of outer edges.

11. The computer-implemented method of claim 10, further comprising arranging the quantifier sets in the plan partition in lexicographical order at the QEP optimizer server.

12. The computer program product of claim 11, wherein partitioning the plurality of subproblems into a plurality of partitions comprises dividing the search space into strata corresponding to the number of quantifiers of the QEP referencing the combined set of quantifiers for the constituent QEPs.

13. The computer program product of claim 12, wherein partitioning the plurality of subproblems into a plurality of partitions comprises dividing a range of a first set of constituent QEPs into smaller contiguous ranges of equal size, wherein the range in the plan partition is based on the lexicographical order.

14. The computer program product of claim 12, wherein partitioning the plurality of subproblems into a plurality of partitions comprises randomly allocating sets of quantifiers of a first set of constituent QEPs to partitions.

15. The computer program product of claim 12, wherein partitioning the plurality of subproblems into a plurality of partitions comprises randomly allocating sets of quantifiers of a second set of constituent QEPs to partitions.

16. The computer-implemented method of claim 11, wherein each skip index indicates the number of quantifier sets in the SVA that may be skipped before a particular quantifier is not encountered.

17. A system comprising:
a processor coupled to a memory;
a database;
a query receiver to receive a query for which a query execution plan (QEP) is to be computed, wherein a set comprising all possible QEPs for the query describes a search space, wherein each QEP of the set of possible QEPs references a plurality of quantifiers;
a QEP parallel optimizer comprising:
a subproblem generator to divide the search space into a plurality of subproblems for which constituent QEPs referencing a smaller number of quantifiers are to be created;
generating a skip vector array (SVA) that indicates disjoint quantifier sets between two subproblems;
a partitioner to partition the plurality of subproblems into a plurality of partitions, wherein each of the subproblems within a partition references the same number of quantifiers;
a process allocator to allocate each of the plurality of partitions to a thread of a plurality of threads within a multiple thread architecture, wherein a partition containing subproblems referencing fewer quantifiers is executed before a partition containing subproblems referencing more quantifiers;
receiving from each of the plurality of threads a constituent QEP for each subproblem; and
combining two constituents QEPs at the QEP optimizer server to determine a QEP referencing the combined set of quantifiers for the two constituent QEPs.

18. The system of claim 17, wherein the partitioner excludes subproblems that are indicated as not disjoint by the SVA from the plurality of partitions.

* * * * *